United States Patent
Saghir et al.

(10) Patent No.: US 9,338,685 B2
(45) Date of Patent: May 10, 2016

(54) EVOLVED NODE B RESOURCE MANAGEMENT BASED ON INTEREST INDICATORS

(71) Applicant: Verizon Patent and Licensing Inc., Arlington, VA (US)

(72) Inventors: Amir Saghir, Monmouth Junction, NJ (US); Sergio Aguirre, Southlake, TX (US); Rakesh Chandwani, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 14/249,246

(22) Filed: Apr. 9, 2014

(65) Prior Publication Data
US 2015/0296402 A1    Oct. 15, 2015

(51) Int. Cl.
*H04W 4/00* (2009.01)
*H04W 28/02* (2009.01)

(52) U.S. Cl.
CPC ...... *H04W 28/0215* (2013.01); *H04W 28/0284* (2013.01)

(58) Field of Classification Search
None
See application file for complete search history.

(56) References Cited

U.S. PATENT DOCUMENTS

| | | | | |
|---|---|---|---|---|
| 8,340,002 B2* | 12/2012 | Johansson | ........... | H04L 12/1863 370/235 |
| 2013/0083715 A1* | 4/2013 | Etemad | ................. | H04W 52/04 370/312 |
| 2014/0341188 A1* | 11/2014 | Chang | ..................... | H04W 4/06 370/331 |
| 2015/0124682 A1* | 5/2015 | Phan | ....................... | H04W 4/06 370/312 |

\* cited by examiner

*Primary Examiner* — Frank Duong

(57) ABSTRACT

A server device may store information identifying that one or more first user devices, currently connected to a network device via a particular band, should continue to communicate via the particular band when a connection threshold, associated with the particular band, has been exceeded. The particular band may be associated with a multicast service that provides multicast content to the one or more first user devices via the particular band. The server device may determine that the connection threshold has been exceeded; identify a second user device, currently connected to the network device via the particular band, that should no longer communicate via the particular band when the connection threshold has been exceeded disconnected; and prevent the second user device from communicating via the particular band based on determining that the connection threshold has been exceeded and identifying the second user device.

20 Claims, 9 Drawing Sheets

US 9,338,685 B2

EVOLVED NODE B RESOURCE MANAGEMENT BASED ON INTEREST INDICATORS

BACKGROUND

Mobile wireless devices (e.g., smart phones, tablet computing devices, etc.) may include communication devices that can receive content (e.g., video content, audio content, etc.) from a content provider. The mobile wireless devices connect to a wireless network, such as a cellular network, to receive the content from the content provider.

Multicast broadcast techniques (e.g., multimedia broadcast multicast service ("MBMS")) may be used to provide content to multiple mobile devices over a single channel. In contrast, with a unicast transmission, content transmitted to multiple mobile devices may require multiple channels that are each dedicated to a single mobile device. While providing content via a multicast broadcast may limit strain on the wireless network in relation to when content is provided via unicast transmission, multicast resources, used to provide content via multicast broadcast techniques, may be limited.

DETAILED DESCRIPTION OF THE PREFERRED EMBODIMENTS

The following detailed description refers to the accompanying drawings. The same reference numbers in different drawings may identify the same or similar elements.

User devices may attach to base stations in order to access a wireless network (e.g., a cellular network). The base stations may be associated with cells, which are each associated with a particular frequency band via which user devices may communicate with the wireless network. Some cells may support multicast or broadcast techniques, such as multimedia broadcast multicast service ("MBMS"), evolved MBMS ("eMBMS") while others may not support such techniques. For example, cells that support MBMS (referred to herein as "MBMS cells") may be associated with a frequency band (referred to herein as an "MBMS band") via which content may be provided using MBMS techniques. Cells that do not support MBMS (referred to herein as "non-MBMS cells") may be associated with a different frequency band (referred to herein as a "non-MBMS band") via which content may be provided without using MBMS techniques.

When MBMS cells become overloaded, additional user devices may not be able to attach to the MBMS cells. In situations where non-MBMS user devices (e.g., user devices that are not receiving, or whose users are not interested in receiving, content via MBMS techniques) are attached to MBMS cells, the resources of MBMS cells may be needlessly consumed by the non-MBMS user devices, while MBMS user devices (e.g., user devices whose are interested in receiving content via MBMS techniques) may not be able to attach to the MBMS cells.

Figure 1:
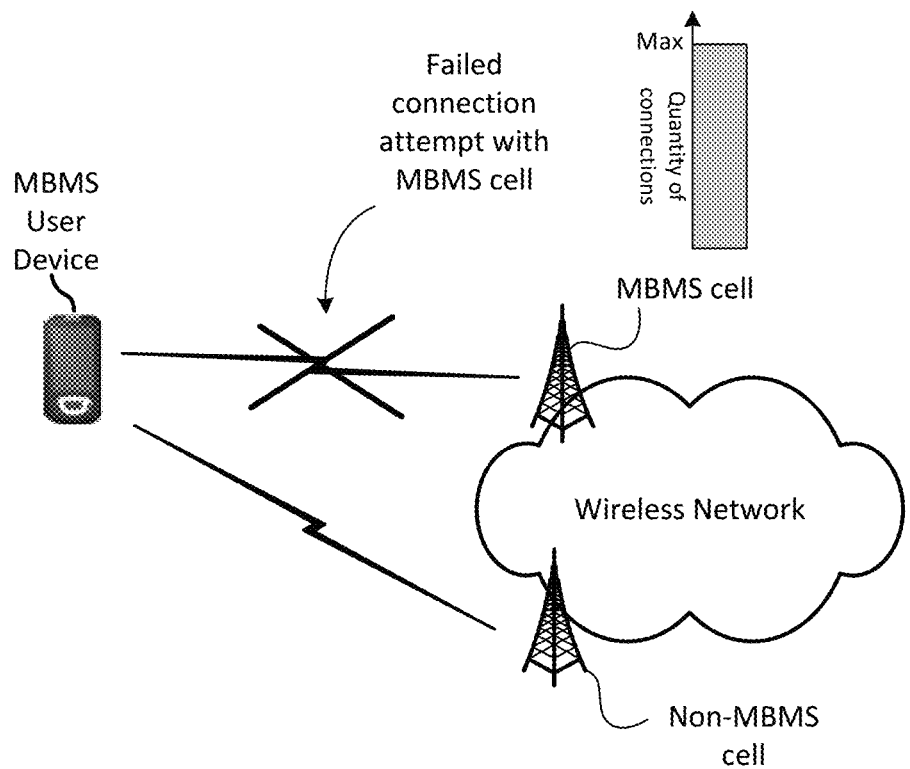
FIG. 1 illustrates a situation where permitting a user device to provide an interest indicator may be desirable.

For example, as shown in FIG. 1, an MBMS user device may attempt to attach to a wireless network via an MBMS cell. As shown, the MBMS user device may fail to attach to the MBMS cell. Such a situation may occur, for example, when the MBMS cell has become overloaded. For example, the MBMS cell may become overloaded when the MBMS cell has reached a maximum quantity of connections with other user devices, such as when the other user devices move relatively close to each other (e.g., at a sports venue, a concert venue, etc.). As a result, the MBMS user device may attach to another cell in order to access the wireless network. As shown, the cell may be a non-MBMS cell. When connected with the non-MBMS wireless cell, the user device may not receive multicast data (e.g., content, such as video content) sent via the MBMS cell. Thus, in order to obtain the same content in which a user of the MBMS user device is interested, the content may be provided, using a unicast technique, via the non-MBMS cell. Thus, excess network resources may be used to provide the content to the MBMS user device (e.g., the same content, multicasted by the MBMS cell, may also need to be unicasted via the non-MBMS cell). Further, the non-MBMS cell may, in some situations, not be capable of supporting content of the same quality as the MBMS cell, and the user experience may suffer as a result.

Figure 2:
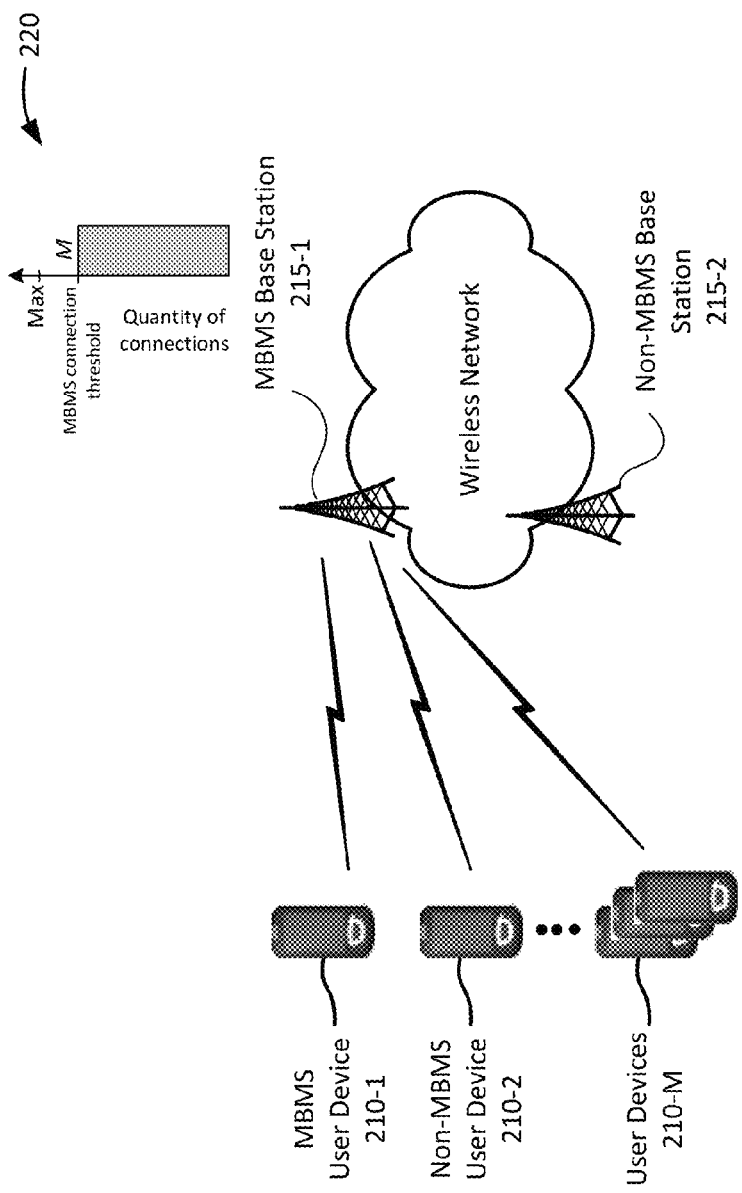
FIGS. 2-4 illustrate an example implementation as described herein.
Figure 3:
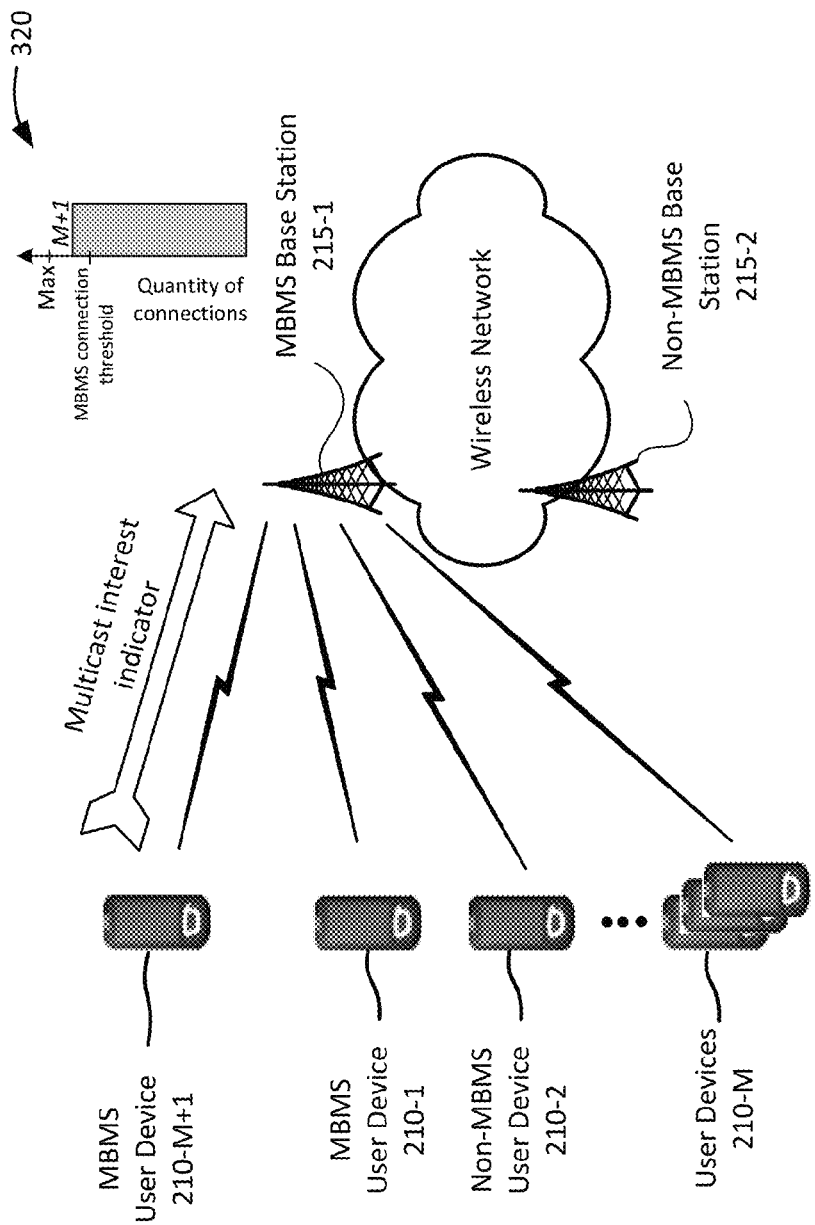
Figure 4:
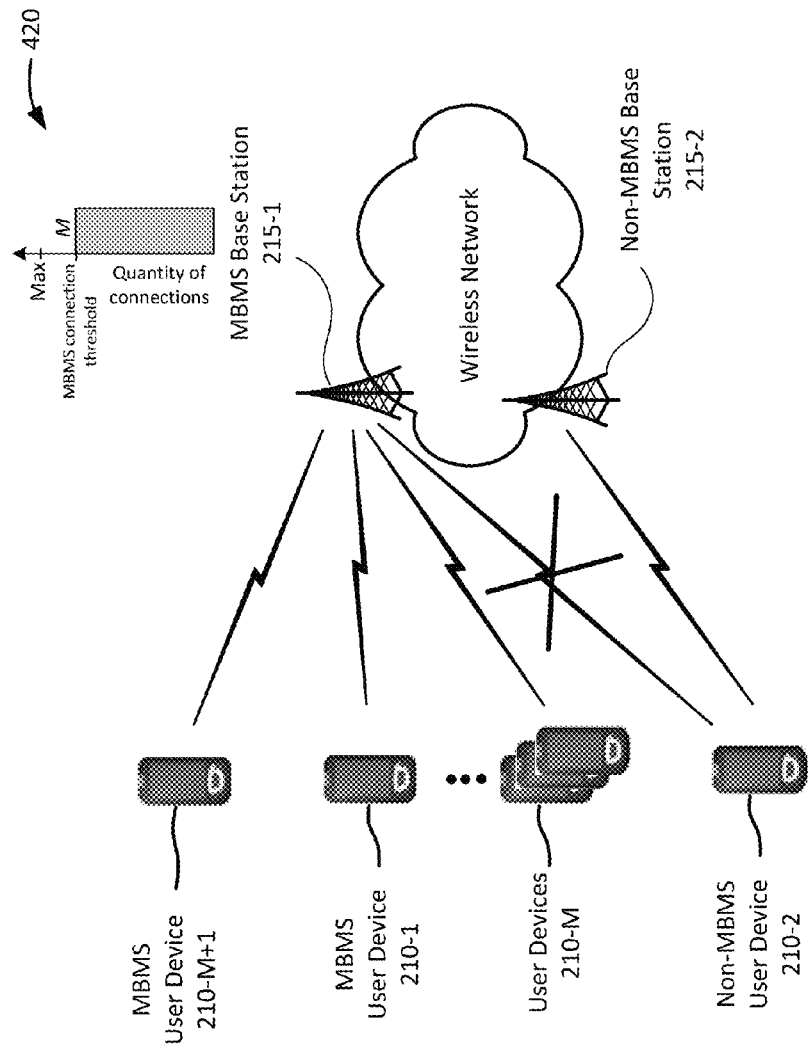

Systems and/or methods, as described herein, may prevent non-MBMS user devices from consuming resources of MBMS cells. By preventing the non-MBMS user devices from consuming the resources of the MBMS cells, these resources may be made available for use by MBMS user devices. FIGS. 2-4 illustrate an example of an overview of one or more implementations described herein.

As shown in FIG. 2, assume that user device 210-1 is an MBMS user device, and that user device 210-2 is a non-MBMS user device. Also assume that cell 215-1 is an MBMS cell 215, and that cell 215-2 is a non-MBMS cell 215. As shown in FIG. 2, user devices 210-1 through 210-M (where M is an integer greater than 1) may connect to MBMS cell 215-1 in order to access a wireless network. Further assume that M also represents a connection threshold (e.g., a threshold quantity of connection, after which MBMS cell 215-1 is considered "overloaded").

As shown in FIG. 3, another user device, (i.e., MBMS user device 210-M+1) may attach to MBMS cell 215-1. As shown in graph 320, MBMS cell 215-1 may now maintain M+1 connections with user devices. That is, graph 320 may show that the connection threshold of MBMS cell 215-1 has been exceeded. As further shown, MBMS user device 210-M+1 may output a multicast interest indicator ("MII"). The MII may indicate an interest in receiving content provided via MBMS.

Referring to FIG. 4, non-MBMS user device 210-2 may be disconnected from MBMS cell 215-1, and may connect to non-MBMS cell 215-2. Once non-MBMS user device 210-2 has disconnected from MBMS cell 215-1, MBMS cell 215-1 may be connected with M user devices 210, thereby bringing the quantity of connections back down to the connection threshold. As a result, non-MBMS user device 210-2 may access the wireless network without consuming resources of MBMS cell 215-1. Further, the quantity of connections, associated with MBMS cell 215-1, may remain below a maximum connection quantity, thereby permitting a subsequent user device 210 to connect with MBMS cell 215-1, and providing user device 210 with an opportunity to receive content provided via MBMS. In some implementations, if the quantity of connections is below the connection threshold, then MBMS cell 215-1 may maintain connections with both non-MBMS and MBMS user devices. Once the quantity of connections exceeds the connection threshold, MBMS cell 215-1 may move non-MBMS user devices to non-MBMS cell 215-2.

Figure 5:
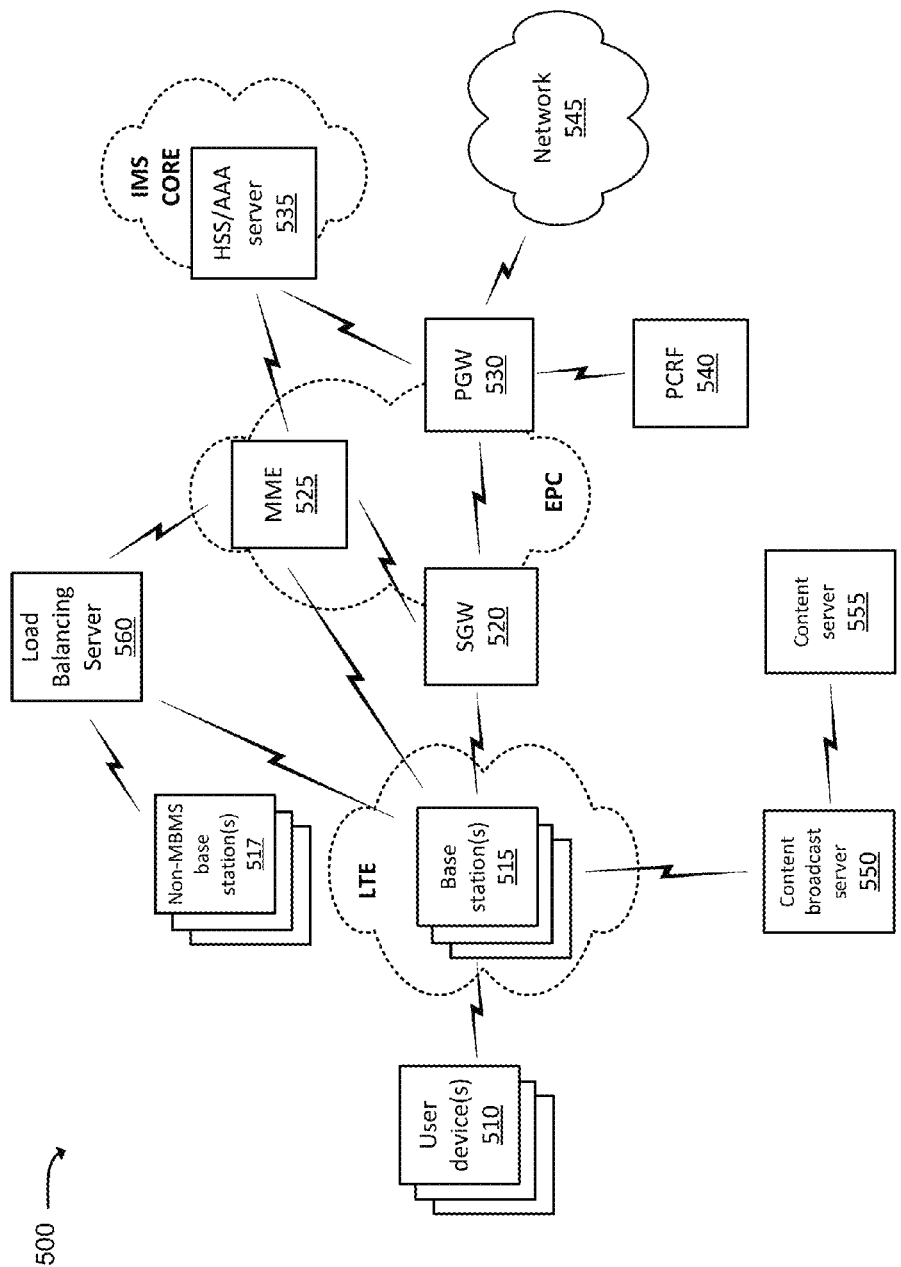
FIG. 5 illustrates an example environment in which systems and/or methods, described herein, may be implemented.

FIG. 5 illustrates an example environment 500, in which systems and/or methods described herein may be implemented. As shown in FIG. 2, environment 500 may include one or more user devices 510, one or more base stations 515, one or more non-MBMS base stations 517, serving gateway ("SGW") 520, mobility management entity ("MME") 525, packet data network ("PDN") gateway ("PGW") 530, home subscriber server ("HSS")/authentication, authorization, accounting ("AAA") server (hereinafter referred to as "HSS/AAA server") 535, policy charging and rules function ("PCRF") 540, network 545, content broadcast server 550, content server 555, and load balancing server 560.

The quantity of devices and/or networks, illustrated in FIG. 5, is provided for explanatory purposes only. In practice, there may be additional devices and/or networks; fewer devices and/or networks; different devices and/or networks; or differently arranged devices and/or networks than illustrated in FIG. 5. Alternatively, or additionally, one or more of the devices of environment 500 may perform one or more functions described as being performed by another one or more of the devices of environment 500. Devices of environment 500 may interconnect via wired connections, wireless connections, or a combination of wired and wireless connections. The connections shown in FIG. 5 are example connections; in some implementations, devices in environment 500 may communicate with other devices in environment 500 even where a connection is not shown in FIG. 5.

Environment 500 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 515, some or all of which may take the form of an eNodeB ("eNB"), via which user device 510 may communicate with the EPC network. The EPC network may include one or more SGWs 520, MMEs 525, and/or PGWs 530, and may enable user device 510 to communicate with network 545 and/or an Internet protocol ("IP") multimedia subsystem ("IMS") core network. The IMS core network may include HSS/AAA server 535, and may manage authentication, session initiation, account information, a user profile, etc. associated with user device 510.

User device 510 may include a computation and communication device, such as a wireless mobile communication device that is capable of communicating with one or more networks (e.g., network 545 and/or the IMS core). For example, user device 510 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a personal gaming system, and/or another type of mobile computation and communication device.

In certain situations, user device 510 may be referred to as "MBMS user device 510" or "non-MBMS user device 510." For example, user device 510 may be considered to be an MBMS user device 510 when indicating interest in receiving content provided via MBMS (e.g., based on an MII provided by user device 510). On the other hand, user device 510 may be considered to be a non-MBMS user device 510 when an interest in receiving content, provided via MBMS, has not been provided by user device 510. For instance, user device 510 may be considered to be a non-MBMS user device 510 when an MII has not been received from user device 510, when a previously provided MII expires, and/or when user device 510 discontinues communication with base station 515 (at which point, information associating the MII for user device 510 may be discarded). A non-MBMS user device 510 may later become an MBMS user device 510 when an MII is later provided.

Base station 515 may include one or more network devices that receive, process, and/or transmit traffic, such as calls, audio, video, text, television programming content, and/or other data, destined for and/or received from user device 510. In one example, base station 515 may be an eNB device and may be part of the LTE network. Base station 515 may receive traffic from and/or send traffic to network 545 via SGW 520 and PGW 530. Base station 515 may send traffic to and/or receive traffic from user device 510 via an air interface. Base station 515 may be associated with an MBMS cell. In some implementations, base station 515 may additionally be associated with a non-MBMS cell. For example, a single base station 515 may include multiple radios to establish connections with user devices 510 via MBMS and non-MBMS bands. Base station 515 may communicate with content broadcast server 550 to provide content to user device 510 via an MBMS band using MBMS techniques.

Non-MBMS base station 517 may include one or more network devices that receive, process, and/or transmit traffic, such as calls, audio, video, text, television programming content, and/or other data, destined for and/or received from user device 510. In one example, base station 517 may be an eNB device. Base station 517 may be associated with non-MBMS cells, and may establish connections with user device 510 via a non-MBMS band. Base station 517 may transmit traffic to and/or from user device 510 via the non-MBMS band using non-MBMS techniques.

SGW 520 may include one or more network devices that gather, process, search, store, and/or provide information. For example, SGW 520 may include a gateway, a router, a modem, a switch, a firewall, a network interface card ("NIC"), a hub, a bridge, a proxy server, or some other type of device that processes and/or transfers traffic. SGW 520 may, for example, aggregate traffic received from one or more base stations 515 and may send the aggregated traffic to network 545 and/or another network via PGW 530. SGW 520 may also aggregate traffic received from network 545 and/or another network (e.g., via PGW 530) and may send the aggregated traffic to user devices 510 via one or more base stations 515 and/or 517.

MME 525 may include one or more computation and communication devices that gather, process, search, store, and/or provide information. For example, MME 525 may perform operations to register user device 510 with the EPS, to establish bearer channels associated with a session with user device 510, to hand off user device 510 from the EPS to another network, to hand off user device 510 from the other network to the EPS, hand off user device 510 from one base station 515 and/or 517 to another base station 515 and/or 517, and/or to perform other operations. MME 525 may perform policing operations on traffic destined for and/or received from user device 510.

PGW 530 may include one or more network devices, or other types of computation and communication devices, that gather, process, search, store, and/or provide information in a manner described herein. For example, PGW 530 may include a gateway, a router, a modem, a switch, a firewall, a NIC, a hub, a bridge, a proxy server, an optical add-drop multiplexer ("OADM"), and/or some other type of device that processes and/or transfers traffic. PGW 530 may aggregate traffic received from one or more SGWs 520, and may send the aggregated traffic to network 545. PGW 530 may also, or alternatively, receive traffic from network 545 and may send the traffic toward user device 510 via SGW 520, and/or base station 515.

HSS/AAA server 535 may include one or more server devices, or other types of devices, that gather, process, search, store, and/or provide information. For example, HSS/AAA server 535 may manage, update, and/or store, in a memory associated with HSS/AAA server 535, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 510 and/or one or more other user devices 510. Additionally, or alternatively, HSS/AAA server 535 may perform authentication, authorization, and/or accounting operations associated with the subscriber and/or a communication session with user device 510.

PCRF 540 may include one or more server devices, or other types of devices, that aggregate information to and from the EPC network and/or other sources. PCRF 540 may receive information regarding policies and/or subscriptions from one or more sources, such as subscriber databases and/or from one or more users (such as, for example, an administrator associated with PCRF 540).

Network 545 may include one or more wired and/or wireless networks. For example, network 545 may include a cellular network, such as a second generation ("2G") network, a third generation ("3G") network, a fourth generation ("4G") network, a fifth generation ("5G") network, and/or another type of cellular network. Additionally, or alternatively, network 545 may include a public land mobile network ("PLMN"), a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, some or all of network 545 may be provided by one or more cellular network providers. That is, in some such implementations, network devices within, or associated with, network 545, may be provided by the one or more cellular network providers. In some implementations, network 545 may be communicatively coupled to one or more other networks, such as the Internet.

Content broadcast server 550 may include one or more server devices, which may facilitate in the broadcasting of content to multiple user devices 510. In some implementations, content broadcast server 550 may broadcast programming content, provided by content server 555, via one or more base stations 515. A more detailed example of content broadcast server 550, in accordance with some implementations, is described below with respect to FIG. 3. In some implementations, content broadcast server 550 may implement an MBMS standard, an eMBMS standard, a Cell Broadcast Service ("CBS") standard (e.g., as standardized by the 3GPP), and/or another methodology of broadcasting messages or other content. As described herein, content broadcast server 550 may facilitate the providing of multiple content streams (e.g., video streams) via a single transport bearer channel (e.g., a single MBMS channel or a single eMBMS channel).

Content server 555 may provide content, such as programming content, to content broadcast server 550 for broadcast to user device 510. Content server 555 may be associated with a content provider, such as a television company, an on-demand movie company, and/or another distributor of content. The content may be, for example, programming content, such as television content, movie content, music content, and/or other types of content.

Load balancing server 560 may include one or more server devices, which may store information identifying a connection threshold for an MBMS cell associated with base station 515. As described below, and in accordance with some implementations, once the connection threshold has been exceeded, non-MBMS user devices 510 may be moved to non-MBMS cells associated with base station 515 and/or non-MBMS base station 517. Load balancing server 560 may store information associating an MII with user device 510 to identify MBMS user devices 510. Load balancing server 560 may delete information, associating an MMI with user device 510, when communications between user device 510 and base station 515 is discontinued, goes idle, and/or when user device 510 discontinues receiving multicast content after a particular period of time.

Figure 6:
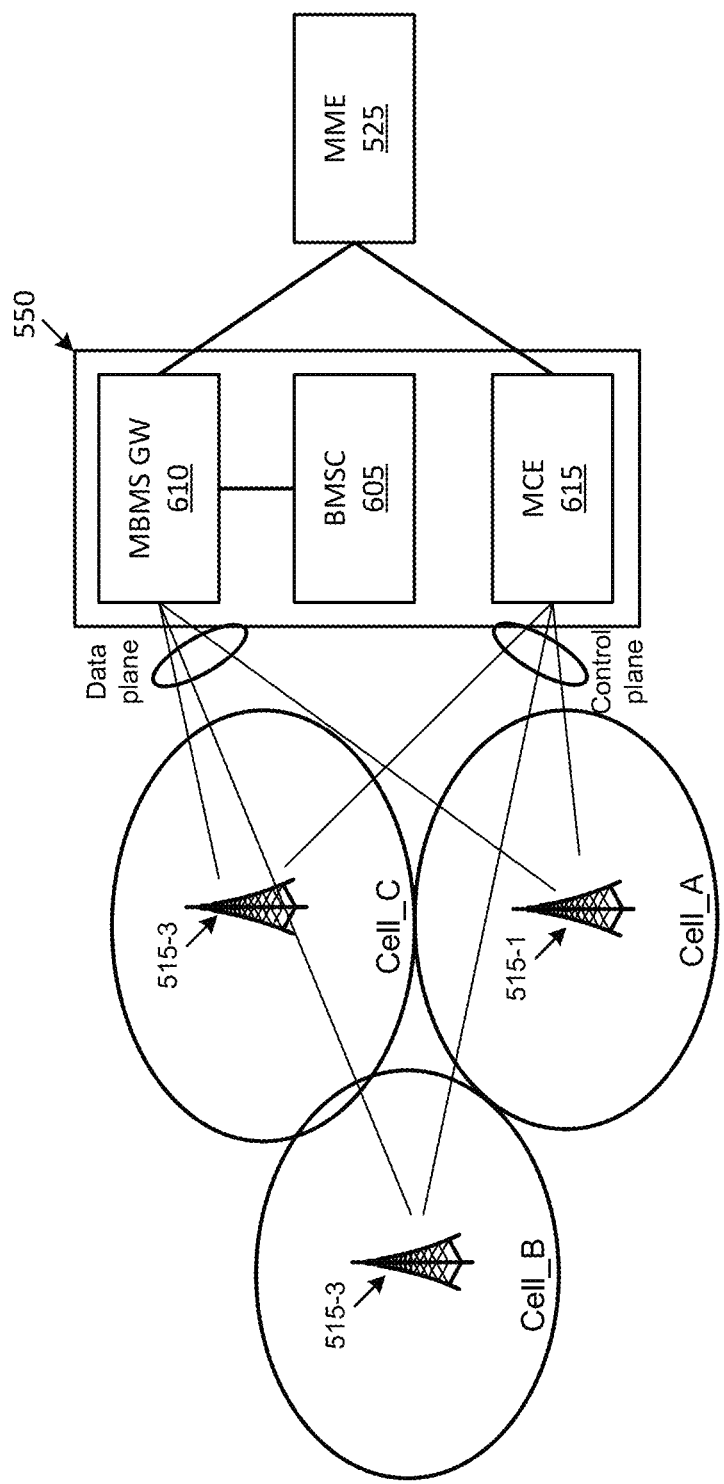
FIG. 6 illustrates some components of the environment of FIG. 5 in additional detail.

FIG. 6 illustrates some components of environment 500 in additional detail. As shown in FIG. 6, content broadcast server 550 may include Broadcast Multicast Service Center ("BMSC") 605, MBMS Gateway ("MBMS GW") 610, and Multi-cell/multicast Coordination Entity ("MCE") 615. In the example shown in FIG. 6, content broadcast server 550 may be in communication with base stations 515-1 through 515-3, each of which may be associated with a respective coverage area, or "cell" (shown in the figure as "Cell_A," "Cell_B," and "Cell_C").

BMSC 605 may include one or more computation or communication devices that provide for the coordination of broadcasting and/or multicasting using MBMS, eMBMS, CBS, and/or another broadcast technique. BMSC 605 may perform functions relating to authorization, charging, and assignment of communication channels. For example, BMSC 605 may assign a particular quantity of broadcast and/or multicast data channels for various content streams. BMSC 605 may also receive content (e.g., programming content from content server 555) for broadcast transmission, and may forward the received content as part of a broadcast or a multicast transmission.

MBMS GW 610 may include one or more computation and communication devices that provide for the coordination of the sending of broadcast and/or multicast data (e.g., IP multicast packets) to base stations 515. MBMS GW 610 may receive the content, which is to be broadcasted and/or multicasted, from BMSC 605. As illustrated, MBMS GW 610 may transmit MBMS data plane traffic to base stations 515. For instance, MBMS GW 610 may forward content, received via the transport layer sessions, over one or more broadcast transport bearer channels (e.g., one or more MBMS bearer channels and/or one or more eMBMS bearer channels).

As mentioned above, MME 525 may perform policing operations on traffic destined for and/or received from user device 510. MME 525 may, in some implementations, aid in the control signaling necessary for messages to be broadcasted and/or multicasted to user devices 510 associated with base stations 515.

MCE 615 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 615 may transmit MBMS control plane traffic to base stations 515. In some implementations, MCE 615 may be involved in the establishment of a transport bearer channel (e.g., an MCH).

In eMBMS, cells associated with base stations 515 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Figure 7:
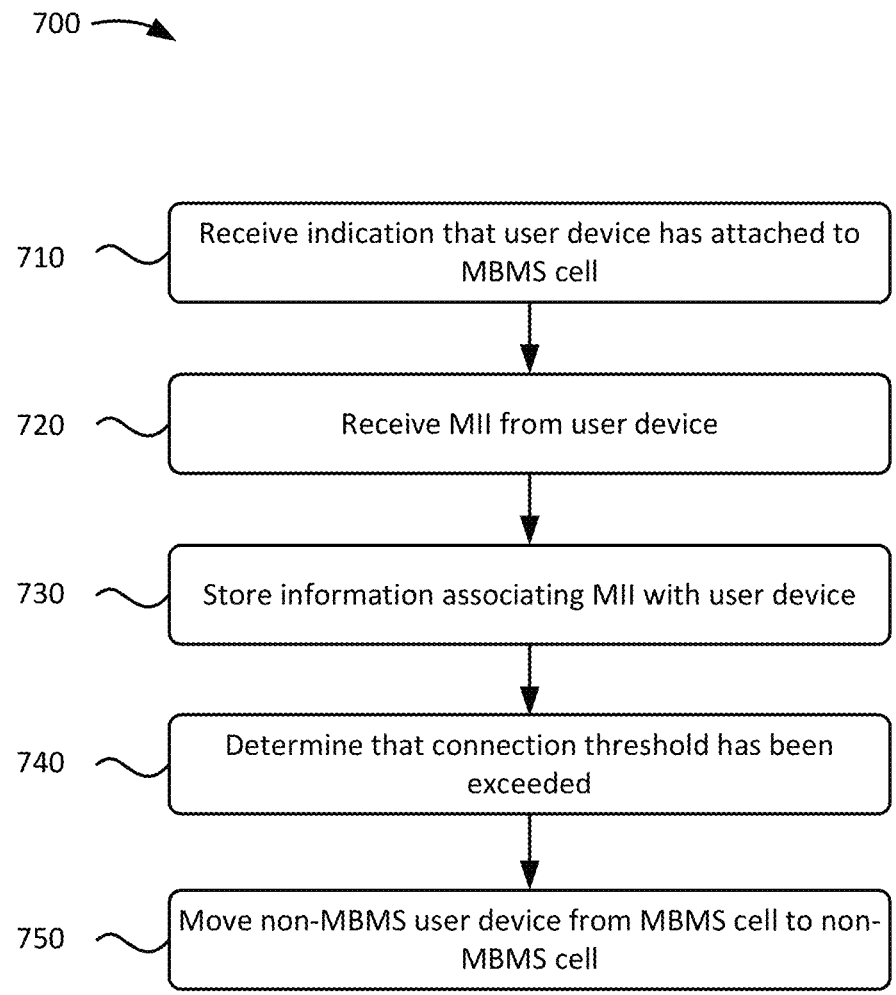
FIG. 7 illustrates a flowchart of an example process for moving non-MBMS user devices to a non-MBMS cell.

FIG. 7 illustrates a flowchart of an example process 700 for moving non-MBMS user devices to a non-MBMS cell. In some implementations, process 700 may be performed by load balancer server 560. In some implementations, some or all of blocks of process 700 may be performed by other devices in addition to, or in lieu of, load balancing server 560.

As shown in FIG. 7, process 700 may include receiving an indication that a user device has attached to an MBMS cell (block 710). For example, load balancing server 560 may receive an indication that user device 510 has attached to an MBMS cell associated with base station 515. That is, load balancing server 560 may receive an indication that base station 515 has attached to user device 510 via an MBMS band.

In some implementations, base station 515 may attach to user device 510 via the MBMS band when user device 510 sends an attachment request to base station 515 and when base station 515 has capacity to accept the attachment request. In some implementations, base station 515 may attach with user device 510 via the MBMS band when user device 510 enters a connection range of base station 515. Additionally, or alternatively, base station 515 may attach to user device 510 via the MBMS band when user device 510 enters an active mode from an idle mode. Additionally, or alternatively, base station 515 may attach to user device 510 via the MBMS band when user device 510 requests to communicate with base station 515 (e.g., when a user of user device 510 selects an option to request and/or receive multicast content).

Process 700 may also include receiving an MII from the user device (block 720). For example, load balancing server 560 may receive the MII from user device 510 via base station 515. User device 510 may provide the MII after receiving a request (e.g., from the user of user device 510) for multicast content. For example, content broadcast server 550 may cause base station 515 to broadcast content (e.g., video content, such as television shows, movies, etc. provided by content server 555), and the user of user device 510 may indicate to user device 510 (e.g., via a user interface) that the user is interested in accessing the content. In some implementations, user device 510 may provide the MII when initially attaching to base station 515. In some implementations, user device 510 may not initially provide the MII when attaching to base station 515, but may later provide the MII after the user of user device 510 indicates an interest in accessing multicast content. As described above, load balancing server 560 may determine, based on receiving the MII, that user device 510 is an MBMS user device 510 and that user device 510 should receive multicast content.

Process 700 may further include storing information associating the MII with the user device (block 730). For example, load balancing server 560 may store (e.g., in a data structure) information that uniquely identifies user device 510 (e.g., a mobile device number, a serial number, an international mobile equipment identifier (IMEI), an internal circuit card identifier (ICCID), international mobile subscriber identifier (IMSI), etc.) and an association between the MII and the information identifying user device 510. The information, associating the MII with user device 510, may indicate that user device 510 is an MBMS user device 510 that should have access to multicast resources (e.g., via a connection with an MBMS cell).

In some implementations, load balancing server 560 may remove the information associating the MII with user device 510. For example, load balancing server 560 may remove the information associating the MII with user device 510 after communications between user device 510 and base station 515 have been discontinued (e.g., when user device 510 leaves a communication area associated with base station 515, when user device 510 is powered off, etc.). Additionally, or alternatively, load balancing server 560 may remove the information associating the MII with user device 510 after a period of time in which user device 510 has discontinued receiving multicast content. Additionally, or alternatively, load balancing server 560 may remove the information associating the MII with user device 510 when user device 510 provides an indication that the user is no longer interested in receiving multicast content (e.g., when the user exits a content receiving application or otherwise indicates that the user is no longer interested in receiving multicast content).

Process 700 may also include determining that a connection threshold has been exceeded. For example, load balancing server 560 may determine that the connection threshold has been exceeded when the quantity of established MBMS connections (e.g., connections associated with MBMS bands) for base station 515 exceeds the connection threshold. Base station 515 may permit the connection threshold to be exceeded in order to attach with user device 510, as described above with respect to process block 710. Base station 515 may permit the connection threshold to be exceeded to provide user device 510 with an opportunity to provide an MII.

Process 700 may further include moving a non-MBMS user device from an MBMS cell to a non-MBMS cell (block 750). For example, load balancing server 560 may move a non-MBMS user device 510 to a non-MBMS cell when the connection threshold has been exceeded. In some implementations, load balancing server 560 may be implemented within a base station 515 that includes multiple radios (e.g., an MBMS radio used to communicate via an MBMS band, and a non-MBMS radio used to communicate via a non-MBMS band). In such an implementation, load balancing server 560 may cause base station 515 to switch the connection with the non-MBMS user device 510 from an MBMS radio to a non-MBMS radio, thereby communicating with the non-MBMS user device 210 via the non-MBMS cell associated with the non-MBMS radio. For example, load balancing server 560 may send an instruction to direct non-MBMS user device 210 to discontinue using an MBMS radio to communicate with base station 515, and instead, use a non-MBMS radio to communicate with base station 515. Alternatively, load balancing server 560 may send an instruction to direct base station 515 to discontinue communicating with non-MBMS user device 510 using the MBMS radio, thereby causing non-MBMS user device 510 to communicate with base station 515 using the non-MBMS radio. Additionally, or alternatively, load balancing server 560 may move non-MBMS user device 510 to the non-MBMS cell by re-assigning the transmission of data from an MBMS band to a non-MBMS band associated with base station 515.

Additionally, or alternatively, load balancing server 560 may move non-MBMS user device 510 to the non-MBMS cell by causing non-MBMS user device 510 to discontinue communications with base station 515, and communicate instead with a collocated non-MBMS base station 517. For example, load balancing server 560 may provide an instruction to non-MBMS user device 510 to disconnect from base station 515, and connect with the collocated non-MBMS base station 515. In some implementations, load balancing server 560 may provide an instruction to base station 515 to disconnect user device 510 from base station 515 and provide an instruction to user device 510 to search for and connect with non-MBMS base station 517. Additionally, or alternatively, load balancing server 560 may move non-MBMS user device 510 to the non-MBMS cell by instructing MME 525 to initiate a handover of user device 510 from base station 515 to non-MBMS base station 517.

Load balancing server 560 may move the one or more non-MBMS user devices 510 to a non-MBMS cell in order to reduce the quantity of connections to equal to or less than the connection threshold associated with the MBMS cell. As a result, base station 515 may prevent non-MBMS user devices 510 from connecting to MBMS cells (e.g., an MBMS band associated with base station 515).

Figure 8:
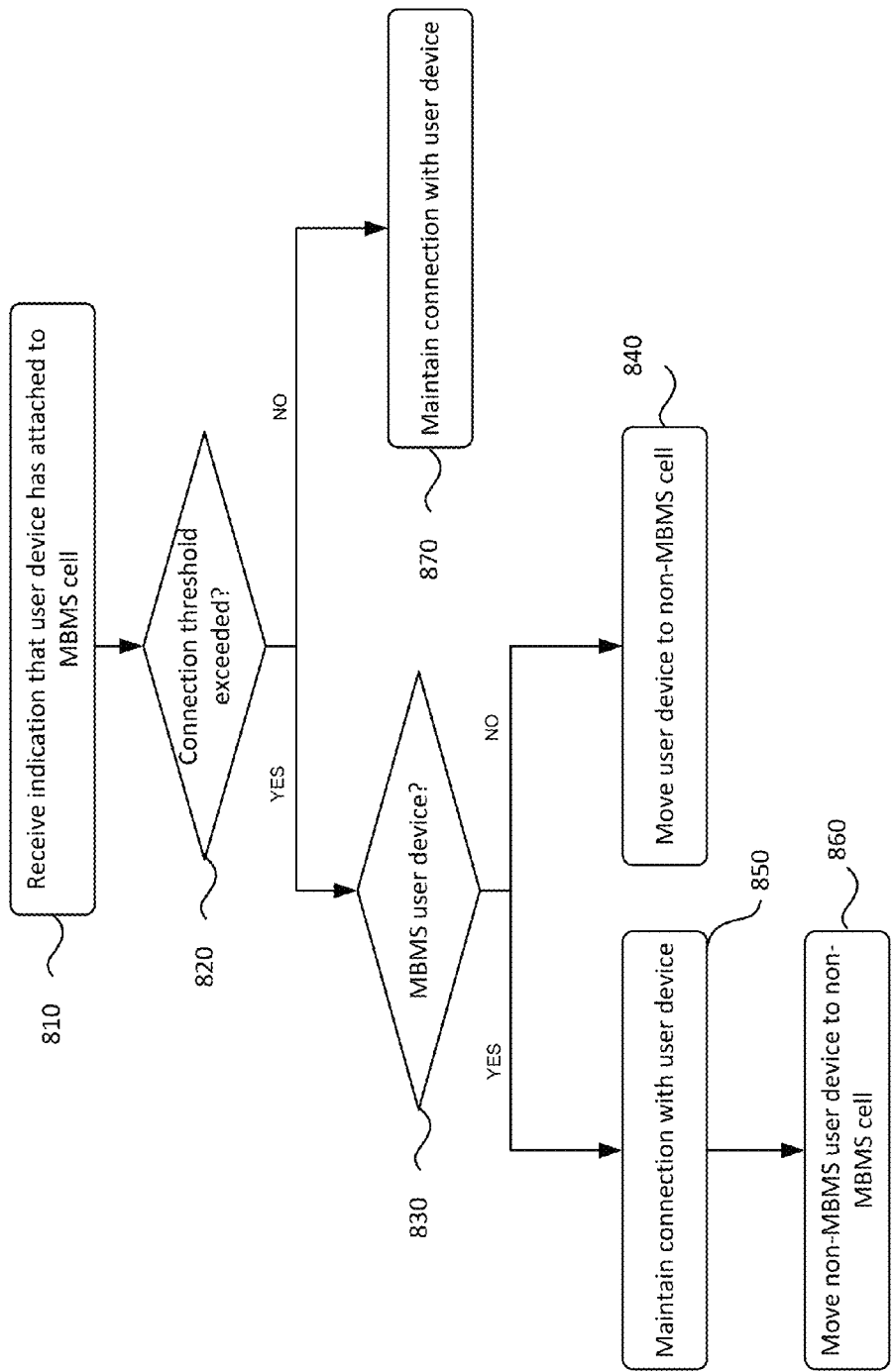
FIG. 8 illustrates a flowchart of an example process for moving non-MBMS user devices to a non-MBMS cell when an MBMS threshold has been exceeded.

FIG. 8 illustrates a flowchart of an example process 800 for moving non-MBMS user devices to a non-MBMS cell when a connection threshold has been exceeded. In some implementations, process 800 may be performed by load balancing server 560. In some implementations, some or all of blocks of process 800 may be performed by other devices in addition to, or in lieu of, load balancing server 560.

As shown in FIG. 8, process 800 may include receiving an indication that a user device has attached to an MBMS cell (block 810). For example, load balancing server 560 may receive an indication that user device 510 has attached to an MBMS cell associated with base station 515. That is, load balancing server 560 may receive an indication that base station 515 attaches to user device 510 via an MBMS band, as described above.

Process 800 may further include determining whether a connection threshold has been exceeded (block 820). For example, load balancing server 560 may determine whether the connection threshold has been exceeded based on the quantity of MBMS connections established between base station 515 and user devices 510. Base station 515 may permit the MBMS threshold to be exceeded in order to establish a connection with user device 510, as described above with respect to process block 810. Base station 515 may permit the MBMS threshold to be exceeded to provide user device 510 with an opportunity to provide an MIL If load balancing server 560 determines that the connection threshold has been exceeded (block 820—YES), process 800 may include determining whether the user device is an MBMS user device (block 830). For example, load balancing server 560 may determine that user device 510 is an MBMS user device 510 based on receiving an MMI from user device 510 (e.g., via base station 515). As described above, user device 510 may provide the MII when a user of user device 510 selects to receive multicast content, or if user device 510 has otherwise indicated an interest in receiving multicast content. Load balancing server 560 may not receive the MMI from user device 510 if user device 510 does not select to receive multicast content, or if user device 510 has not provided an indication of interest in receiving multicast content. In some implementations, load balancing server 560 may allow a particular amount of time for user device 510 to provide an MMI before concluding that user device 510 is a non-MBMS user device 510.

In some implementations, load balancing server 560 may identify MBMS and non-MBMS user devices 510 based on some other factor besides receiving (or not receiving) an MIL For example, load balancing server 560 may identify that user device 510 is an MBMS user device 510 based on a subscription associated with user device 510. Additionally, or alternatively, load balancing server 560 may identify that user device 510 is an MBMS user device 510 when user device 510 is consuming a level of bandwidth that base station 515 may not be able to provide via a non-MBMS band. For example, load balancing server 560 may identify that user device 510 is an MBMS user device 510 by determining an amount of bandwidth being utilized by user device 510, and determining that the amount of bandwidth satisfies a bandwidth threshold (e.g., an amount of bandwidth that may not be provided by a non-MBMS band). Additionally, or alternatively, load balancing server 560 may determine whether user device 510 is an MBMS user device 510 or a non-MBMS user device 510 based on some other information or technique.

If load balancing server 560 determines that the user device is not an MBMS user device 510 (block 830—NO), process 800 may include moving the user device to a non-MBMS cell (block 540). For example, load balancing server 560 may conclude that user device 510 is a non-MBMS user device 510 (e.g., since the MMI was not received), and may move user device 510 to a non-MBMS cell, as described above with respect to process block 750. In some implementations, load balancing server 560 may cause a non-MBMS user device 510 to discontinue communications with base station 515, and connect with a collocated non-MBMS base station 517. Additionally, or alternatively, load balancing server 560 may cause a non-MBMS user device 510 to discontinue communications via an MBMS band and to communicate via a non-MBMS band. Additionally, or alternatively, load balancing server 560 may cause a non-MBMS user device 510 to discontinue communications via a particular radio. As a result, load balancing server 560 may prevent non-MBMS user device 510 from communicating with load balancing server 560 via an MBMS band.

If, on the other hand, load balancing server 560 determines that the user device is an MBMS user device (block 830—YES), process 800 may include maintaining the connection with the user device (block 850), and moving a non-MBMS user device to a non-MBMS cell (block 860). For example, load balancing server 560 may determine that the MMI has been received and may maintain the connection with user device 510 (e.g., by actively transmitting and/or receiving data to/from user device 510 via the connection). Load balancing server 560 may then move a non-MBMS user device 510 to a non-MBMS cell, for example, reduce the quantity of connections to equal to or below the MBMS threshold. Since the moved user device 510 is a non-MBMS user device (e.g., a user device that is not accessing content provided via MBMS), a user of the non-MBMS user device 510 may not experience a noticeable degradation in performance of the non-MBMS user device 510.

If load balancing server 560 determines that the MBMS threshold has not been exceeded when establishing the commutation with user device 510 (block 820—NO), process 800 may include maintaining the connection with user device 510 (block 870). For example, load balancing server 560 may direct base station 515 to maintain the connection with user device 510 (e.g., by actively transmitting data to/from user device 510) regardless of whether user device 510 is an MBMS user device 510 or a non-MBMS user device 510. As described above, base station 515 may move non-MBMS user devices 510 to non-MBMS entities when the MBMS threshold has been exceeded. In some implementations, load balancing server 560 may direct base station 515 to move non-MBMS user devices 510 to a non-MBMS cell even if the connection threshold has not been exceeded.

Figure 9:
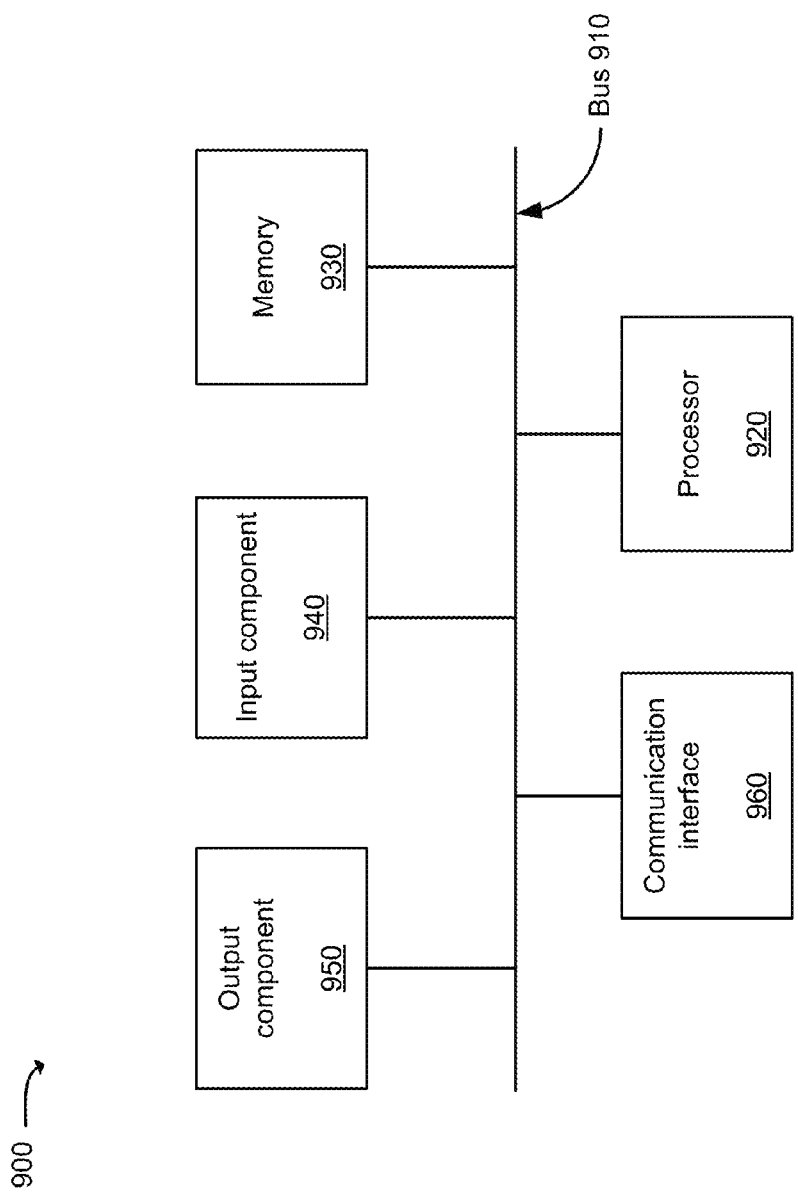
FIG. 9 illustrates example components of a device, in accordance with some implementations described herein.

FIG. 9 is a diagram of example components of device 900. One or more of the devices described above (e.g., with respect to FIGS. 1-6) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7 and 8, the order of the may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 1-6), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms) as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   storing, by a server device, information identifying that one or more first user devices, currently connected to a network device via a particular band, should continue to communicate via the particular band when a connection threshold, associated with the particular band, has been exceeded,
   the particular band being associated with a multicast service that provides multicast content to the one or more first user devices via the particular band;
   determining, by the server device, that the connection threshold has been exceeded;
   identifying, by the server device, a second user device, currently connected to the network device via the particular band, that should no longer communicate via the particular band when the connection threshold has been exceeded; and
   preventing, by the server device, the second user device from communicating via the particular band based on determining that the connection threshold has been exceeded and identifying the second user device.

2. The method of claim 1, wherein the particular band is a first band,
   wherein the preventing includes:
      reassigning the transmission of communications, associated with the second user device, from the first band to a second band,
      the second band being different from the first band and not being associated with the multicast service.

3. The method of claim 1, wherein the particular band is a first band,
   wherein the preventing includes:
      preventing the second user device from communicating via a first radio associated with the first band; and
      causing the second user device to communicate via a second radio associated with a second band,
      the first radio being different from the second radio, the first band being different from the second band, and the second band not being associated with the multicast service.

4. The method of claim 1, wherein the network device is a first network device, wherein the preventing includes:
   directing a mobility management entity device (MME) to hand off a connection between the first network device and the second user device to a second network device and the second user device,
   the first network device being different from the second network device.

5. The method of claim 1, wherein identifying that the second device should no longer communicate via the particular band includes determining that a multicast interest indicator (MII) has not been received from the second user device.

6. The method of claim 1, further comprising:
   receiving a multicast interest indicator (MII) from the one or more first user devices,
   wherein storing the information identifying that one or more first user devices should continue to communicate via the particular band is based on receiving the MII from the one or more first user devices.

7. The method of claim 1, wherein the connection threshold is a quantity of at least one less than a maximum quantity of connections associated with the network device.

8. The method of claim 1, further comprising:
   directing the network device to transmit data to the one or more first user devices via the particular band when the connection threshold has been exceeded.

9. The method of claim 1, wherein the connection threshold specifies a particular quantity of connections with user devices.

10. A system comprising:
    a non-transitory memory device storing:
    a plurality of processor-executable instructions, and
       information identifying that one or more first user devices, currently connected to a network device via a particular band, should continue to communicate via the particular band when a connection threshold, associated with the particular band, has been exceeded,
       the particular band being associated with a multicast service that provides multicast content to the one or more first user devices via the particular band; and
    a processor configured to execute the processor-executable instructions, wherein executing the processor-executable instructions causes the processor to:
       determine that the connection threshold has been exceeded;
       identify a second user device, currently connected to the network device via the particular band, that should no longer communicate via the particular band when the connection threshold has been exceeded; and
       prevent the second user device from communicating via the particular band based on determining that the connection threshold has been exceeded and identifying the second user device.

11. The system of claim 10, wherein the particular band is a first band,
    wherein executing the processor-executable instructions, to prevent the second user device from communicating via the particular band, further causes the process to:
    prevent the second user device from communicating via a first radio associated with the first band; and
    cause the second user device to communicate via a second radio associated with a second band,
    the first radio being different from the second radio, the first band being different from the second band, and the second band not being associated with the multicast service.

12. The system of claim 10, wherein the network device is a first network device, wherein executing the processor-executable instructions, to prevent the second user device from communicating via the particular band, further causes the process to:
    direct a mobility management entity device (MME) to hand-off a connection between the first network device and the second user device to a second network device and the second user device, the first network device being different from the second network device.

13. The system of claim 10, wherein the network device is a first network device, wherein executing the processor-executable instructions, to identify that the second device should no longer communicate via the particular band, further causes the process to:
   determine that a multicast interest indicator (MII) has not been received from the second user device.

14. The system of claim 10, executing the processor-executable instructions further causes the processor to:
   receive a multicast interest indicator (MII) from the one or more first user devices;
   wherein information identifying that one or more first user devices should continue to communicate via the particular band is stored based on receiving the MII from the one or more first user devices.

15. The system of claim 10, wherein the connection threshold is a quantity of at least one less than a maximum quantity of connections associated with the network device.

16. The system of claim 10, executing the processor-executable instructions further causes the processor to:
   directing the network device to transmit data to the one or more first user devices via the particular band when the connection threshold has been exceeded.

17. The system of claim 10, wherein the particular band is a first band,
   wherein executing the processor-executable instructions, to prevent the second user device from communicating via the particular band, further causes the process to:
   reassign the transmission of communications, associated with the second user device, from the first band to a second band,
   the second band being different from the first band and not being associated with the multicast service.

18. The system of claim 10, wherein the connection threshold specifies a particular quantity of connections with user devices.

19. A method comprising:
   receiving, by a server device, an indication that a user device has attached to a network device via a particular band,
      the particular band being associated with a multicast service used to provide the user device with multicast content via the particular band;
   determining, by the server device, that a connection threshold has been exceeded based on receiving the indication that the user device has attached to the network device via the particular band, the connection threshold specifying a particular quantity of connected user devices via the particular band;
   determining, by the server device, whether a multicast interest indicator (MII) has been received from the user device;
   causing, by the server device, the network device to transmit data to the user device via the particular band, after the connection threshold has been exceeded, when determining that the MII has been received from the user device; and
   preventing, by the server device, the user device from communicating via the particular band, after the connection threshold has been exceeded, when determining that the MII has not been received from the user device.

20. The method of claim 19, wherein the network device is a first network device,
   wherein the preventing includes:
      causing the user device to disconnect from the first network device, and
      causing the user device to connect to a second network device,
   the second network device being different from the first network device and being associated with a different band than the particular band.

* * * * *